United States Patent
Simeone et al.

(10) Patent No.: US 12,488,298 B2
(45) Date of Patent: Dec. 2, 2025

(54) SYSTEMS AND METHODS FOR FAILURE DETECTION TOOLS IN LARGE SCALE MAINTENANCE OPERATIONS

(71) Applicants: Michael P. Simeone, Scottsdale, AZ (US); David Little, Mesa, AZ (US); George Boben, Fort Worth, TX (US); Shashank Kapoor, New Delhi (IN); Deepan Nedumaran, Tempe, AZ (US); Aravind Sundaresan, Tempe, AZ (US)

(72) Inventors: Michael P. Simeone, Scottsdale, AZ (US); David Little, Mesa, AZ (US); George Boben, Fort Worth, TX (US); Shashank Kapoor, New Delhi (IN); Deepan Nedumaran, Tempe, AZ (US); Aravind Sundaresan, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 56 days.

(21) Appl. No.: 18/423,637

(22) Filed: Jan. 26, 2024

(65) Prior Publication Data

US 2024/0202625 A1  Jun. 20, 2024

Related U.S. Application Data

(62) Division of application No. 17/513,533, filed on Oct. 28, 2021, now Pat. No. 11,928,622.

(Continued)

(51) Int. Cl.
*G06Q 10/0631* (2023.01)
*G06F 9/54* (2006.01)
*G06Q 10/0633* (2023.01)

(52) U.S. Cl.
CPC ........ *G06Q 10/06312* (2013.01); *G06F 9/54* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 2017/0091289 A1* | 3/2017 | Ohazulike | ............... | G06Q 10/20 |
| 2019/0086911 A1* | 3/2019 | Xin | ............... | G05B 13/0275 |
| 2020/0272112 A1* | 8/2020 | Carullo | ............... | G05B 13/0265 |

FOREIGN PATENT DOCUMENTS

| | | | | |
|---|---|---|---|---|
| WO | WO-9620439 A1 * | 7/1996 | ......... | G05B 19/4184 |
| WO | WO-2013045509 A1 * | 4/2013 | ......... | H04L 41/0663 |
| WO | WO-2016056035 A1 * | 4/2016 | ......... | G06F 11/1484 |

OTHER PUBLICATIONS

T.-H. Guo et al "Sensor Failure Detection and Recovery by Neural Networks", Jul. 1991, NASA Technical Memorandum 104484, pp. 1-7 (Year: 1991).*

* cited by examiner

*Primary Examiner* — Romain Jeanty
(74) *Attorney, Agent, or Firm* — SNELL & WILMER L.L.P.

(57) ABSTRACT

A system for failure detection tools is disclosed. The system may include at least one user device, an application server, and a failure detection system, each of which may be in communication with one or more of the others via at least one network. The failure detection system may receive first data from a data source, process the first data to generate second data, apply a statistical modeling algorithm to make a prediction relating to the first data or the second data, and communicate data relating to the prediction and/or a trend related to the first data or the second data to the user device (Continued)

for displaying at least a portion of the data relating to the prediction and/or the trend on a display of the user device.

19 Claims, 10 Drawing Sheets

Related U.S. Application Data

(60) Provisional application No. 63/107,259, filed on Oct. 29, 2020.

SYSTEMS AND METHODS FOR FAILURE DETECTION TOOLS IN LARGE SCALE MAINTENANCE OPERATIONS

CROSS-REFERENCE TO RELATED APPLICATIONS

This application is a divisional of U.S. Ser. No. 17/513,533 filed on Oct. 28, 2021, now U.S. Patent Application Publication No. 2022-0138652 entitled "SYSTEMS AND METHODS FOR FAILURE DETECTION TOOLS IN LARGE SCALE MAINTENANCE OPERATIONS." U.S. Ser. No. 17/513,533 is a non-provisional of, and claims priority to and the benefit of, U.S. Provisional Application No. 63/107,259 filed on Oct. 29, 2020 and entitled "SYSTEMS AND METHODS FOR FAILURE DETECTION TOOLS IN LARGE SCALE MAINTENANCE OPERATIONS." The foregoing applications are incorporated herein by reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH OR DEVELOPMENT

This invention was made with government support under N00014-15-1-2867 awarded by the Office of Naval Research. The government has certain rights in the invention.

TECHNICAL FIELD

The present disclosure relates to automated forecasting tools, and in particular to forecasting tools in smart building systems, building management, and facilities management systems.

BACKGROUND

Properly maintained facilities and support systems are crucial to the successful execution of daily operations for nearly all mid and large-scale organizations. Furthermore, unforeseen sub-system failures are often highly disruptive, resulting in lost productivity and decreased earning potential. Therefore, it is imperative for maintenance personnel to quickly and effectively correct failures; preferably before they ever become an issue. Real-time sensor technology and Internet of Things (IOT) integration helps to achieve this, but steep implementation costs make this solution impractical for most organizations. Accordingly, improved systems and methods for failure detection tools in large scale maintenance operations are desired.

SUMMARY

In various embodiments, systems, methods, and articles of manufacture (collectively, the "system") for failure detection tools are disclosed. In various embodiments, the system may receive a raw text data, remove a punctuation and a non-informative word from the raw text data, generate a preprocessed text data, apply a Latent Dirichlet Allocation algorithm to the preprocessed text data, generate a topic list comprising a plurality of topics, and evaluate each of the plurality of topics by its coherence.

In various embodiments, the system may remove a topic having a low coherence and remove a proper name from the raw text data. In various embodiments, the system may apply a time based analytic function to the topic list and generate a predictive score of failures associated with the topic types of the topic list. In various embodiments, the time based analytic function is one of a Poisson distribution evaluation, a seasonal autoregressive integrated moving average with exogenous regressors model, or a modified version of the mean absolute percentage error score. In various embodiments, the system may receive a work order and extract the raw text data from the work order, wherein the work order is associated with a building. In various embodiments, the system may estimate a future number of work orders associated with the building.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
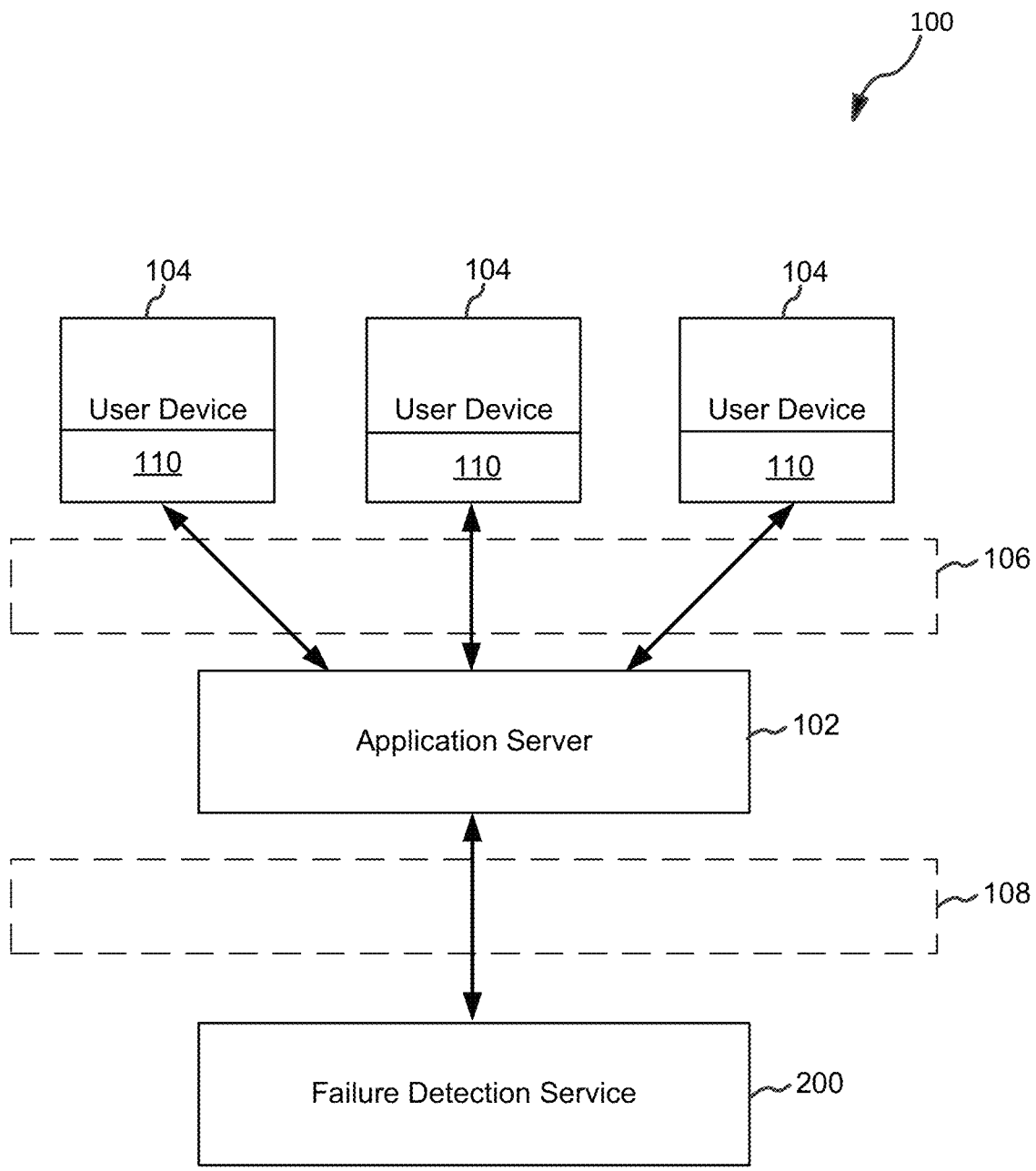
FIG. 1 is a block diagram illustrating various system components of a failure detection tools system in accordance with various exemplary embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

As used herein, "satisfy," "meet," "match," "associated with," or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Systems, methods, and computer program products are provided. In the detailed description herein, references to "various embodiments," "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments related to the present disclosure, well documented work order history can often be found. For example, the Unit for Data Science at Arizona State University has leveraged this largely untapped resource to develop an automated forecasting tool for processing historical work-order text and returning statistically significant trends of keywords defining potential problem areas. A user can then interpret this information with his or her expertise to pinpoint focus areas in an effort to reduce high impact failures. Such a tool may be helpful in analyzing a large amount of data by, e.g., automatically processing the data and generating a new set of useful data.

In various embodiments, and with reference to FIG. 1, a system 100 for failure detection tools is depicted. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 may comprise an application server 102, a user device 104, and a failure detection service (i.e., service 200). Any of these components may be outsourced and/or be in communication with the application server 102 and/or service 200 via a network such as, for example, a first network 106 and a second network 108.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or service 200 may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the service 200 via the second network 108. In this regard, the application server 102 may allow communication from the user devices 104 to systems, engines, and components of system 100 (such as, for example, service 200). In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of data across networks (106, 108).

In various embodiments, a user device 104 may comprise software and/or hardware in communication with the system 100 via a network (e.g., network 106) comprising hardware and/or software configured to allow a user, and/or the like, access to the application server 102. The user device 104 may comprise any suitable device that is configured to allow a user to communicate with a network and the system 100. The user device 104 may include, for example, a personal computer, personal digital assistant, cellular phone, kiosk, mobile device, and/or the like and may allow a user to transmit, e.g., comparison requests to the system 100. In various embodiments, the user device 104 described herein may run a web application or native application to communicate with application server 102. A native application 110 may be installed on the user device 104 via download, physical media, or an app store, for example. The native application 110 may utilize the development code base provided for use with the operating system and capable of performing system calls to manipulate the stored and displayed data on the user device 104 and communicates with application server 102. A web application may be web browser compatible and written specifically to run on a web browser. The web application may thus be a browser-based application that operates in conjunction with application server 102. In various embodiments, the user device 104 may also comprise a display (not shown) as described further elsewhere herein.

In various embodiments, the native application 110 running on the user device 104 may be in communication with the application server 102 to support real-time updates. For example, data pertaining to the service 200 may synchronize across the various user devices 104 used by any number of users interacting with the application server 102 and/or service 200. In this regard, the application server 102 may serve data from service 200 to each of the user devices 104 and may serve commands from the user devices 104 to the service 200. In various embodiments, application server 102 may apply access permissions to restrict the data transmitted between the networks (106, 108) and/or the various components of system 100. Users may be authenticated on the native application 110, for example, via a user name, password, dual factor authentication, private cryptographic key, one-time password, security question, biometrics, or other suitable authentication techniques known to those skilled in the art.

Figure 2:
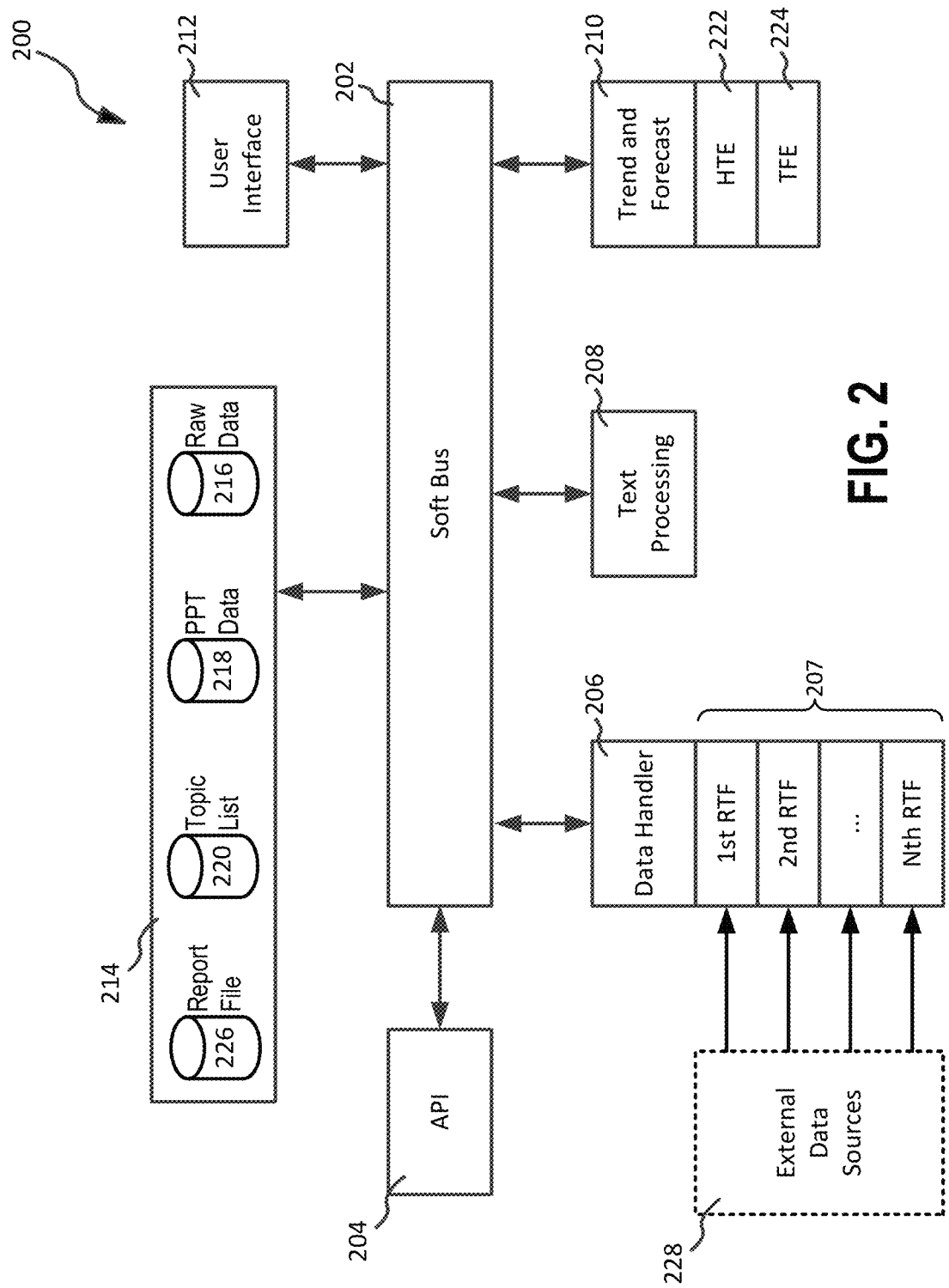
FIG. 2 is a block diagram illustrating a service of a failure detection tools system in accordance with various exemplary embodiments.

With additional reference to FIG. 2, a block diagram of a service 200 of system 100 is illustrated in accordance with various embodiments. Service 200 may comprise a software bus architecture 202, an application programming interface (i.e., API module 204), a data handler 206 module, a text processing module 208, a trend and forecast modeling module 210, a user interface module 212, and a database module 214.

In various embodiments, API module 204, which may, in various embodiments, comprise a set of APIs available for and compatible with one or more external applications, may be configured to provide a programmatic interface to any of the set of system 100 or service 200 services, components, modules, and/or engines. For example, any of these services, components, modules, and/or engines, as well as any data processed and/or generated by one or more of them, may be utilized by other applications serving various relevant purposes.

In various embodiments, the data handler 206 is configured to capture and process data from one or more external data sources 228 into a plurality of data feeds 207 for use by the various systems, engines, and components of service 200. In various embodiments, the data feeds 207 may be real-time data feeds. The data handler 206 may be capable of integrating with a variety of data sources. In various embodiments, the data handler 206 may connect directly to a production database, thus providing the most up-to-date information for service 200 and thereby increasing predictive accuracy of the system 100. In various embodiments, the data handler 206 may be configured to retrieve data (e.g., from the external data sources 228) from data files such as, for example, MICROSOFT® Excel files, comma-separated values files, and/or the like which may be generated and/or transmitted by one or more intermediary entities (not shown) logically disposed, e.g., between the external data sources 228 and the data handler 206. The intermediary entities may comprise any form, such as, e.g., a server or one or more programs which may be separate from or integrated with the external data sources 228 and/or the service 200. In various embodiments, the data handler 206 may be configured to interface with, e.g., a database capable of performing data transfer with another system—as but one example, such database may be a POSTGRESQL database configured to interface with the data handler 206 via a customizable SQL script which enables data retrieval by the data handler 206. In various embodiments, the data handler 206 may extract raw text data 216 for use by the text processing module 208 from a plurality of work orders and/or support tickets (e.g., relating to maintenance operations) retrieved from the external data sources 228 and/or stored in the database module 214. It would be appreciated by one of ordinary skill in the art that the service 200 may be utilized for any type of data from which text (e.g., related to maintenance operations) can be extracted. The database module 214 may be any type of database capable of storing data for use in various embodiments disclosed herein. Each of the plurality of work orders may be associated with one or more entities, such as, e.g., one or more buildings of a plurality of buildings, from which a plurality of work orders may be generated.

Figure 3:
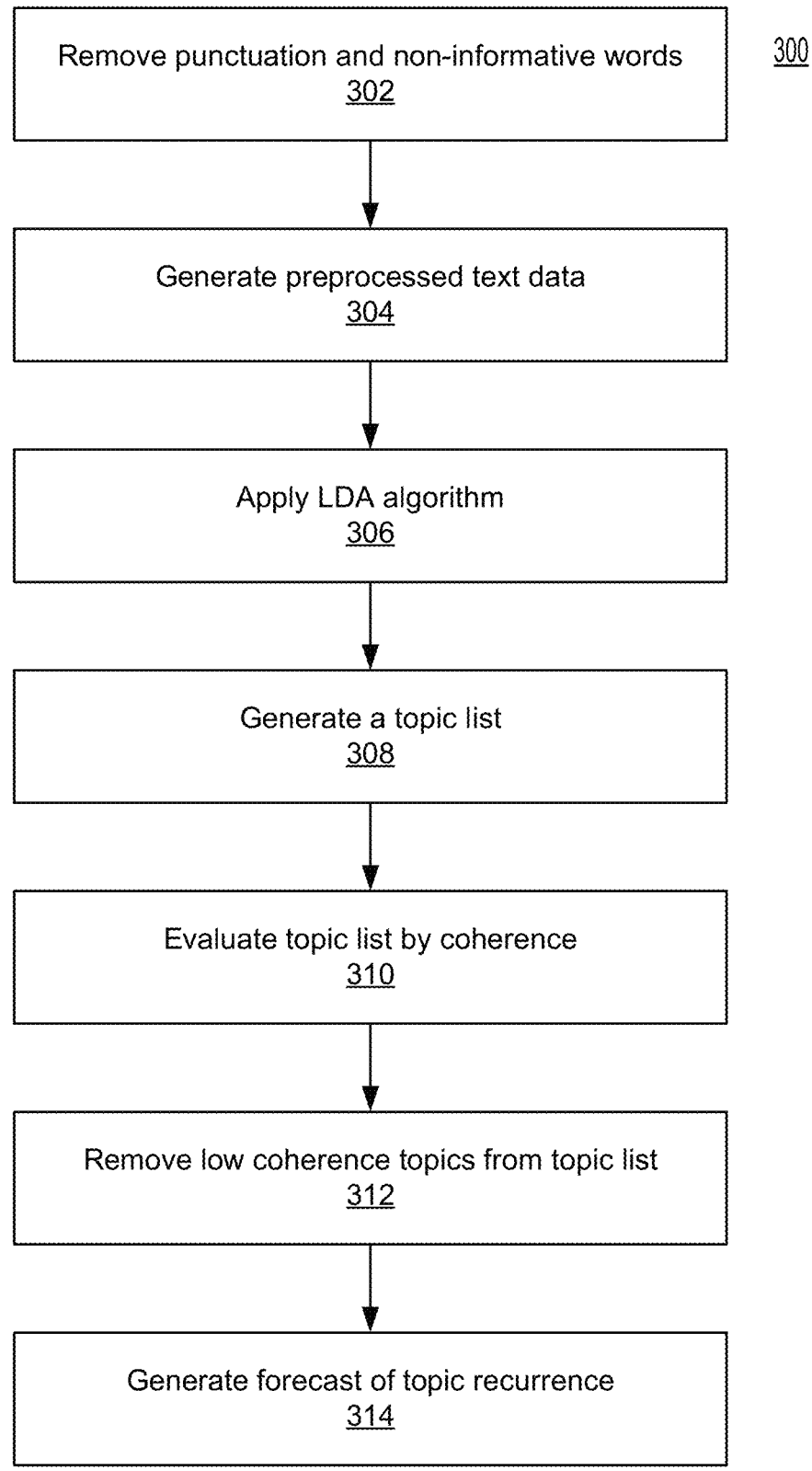
FIG. 3 is process of a failure detection tools system in accordance with various exemplary embodiments.

In various embodiments, the text processing module 208 may be configured to collect and process (e.g., via process 300 illustrated with brief additional reference to FIG. 3) text data from the data handler 206. The text processing module 208 may receive the raw text data 216 and perform various operations and manipulations of the raw text data 216. It would be apparent to one of ordinary skill in the art that the data to be manipulated are not necessarily limited to being in the raw text format so long as the data may be in a format consistent with the spirit and scope of the disclosure. In various embodiments, the text processing module 208 may remove at least a portion of the data retrieved from the data handler 206. For example, the text processing module 208 may remove punctuation and non-informative words from the raw text data 216 (step 302). The text processing module 208 may also remove, e.g., proper names from the raw text data 216 to generate a preprocessed text data (i.e., PPT data 218) (step 304). The service 200 may apply a statistical modeling algorithm to the PPT data 218 to further process the PPT data 218 and generate a set of data stored in a prescribed format or structure so as to allow identification of a trend or forecast based on the generated set of data. For example, the service 200 may apply a Latent Dirichlet Allocation (LDA) algorithm to the PPT data 218 (step 306). In response, the service 200 may categorize, e.g., each work order to an assortment of topics defined by a list of keywords to generate a topic list 220 (step 308). In various embodiments, the list of keywords may be provided by a user or an operator of the service 200. In various embodiments, the list of keywords may be generated by the service 200 as, e.g., the work order data are collected and analyzed over a period of time. In various embodiments, each topic of the topic list 220 may be evaluated by its coherence (step 310). For example, the service 200 may assign a score for each topic by measuring a degree of semantic similarity among at least a portion of the keywords relating to the topic (e.g., top 20 keywords). Topics with low coherence (e.g., topic(s) not meeting a minimum coherence score, which may be adjustable) may be removed and/or excluded from further analysis (step 312). In various embodiments, the service 200 may generate a forecast of topic recurrence (step 314). An exemplary list of keywords and associated topic are provided in Table I below.

TABLE 1

| Topic List and Associated Keywords | |
|---|---|
| Top 20 terms defining Topic 9 are: | Top 20 terms defining Topic 10 are: |
| number | mu |
| name | please |
| contact | swo |
| phone | work |
| email | replace |
| memorial | need |
| union | check |
| department | someone |
| green | water |
| jeffrey | run |
| address | new |
| code | send |
| requester | order |
| control | cooler |
| air | kitchen |

TABLE 1-continued

Topic List and Associated Keywords

| Top 20 terms defining Topic 9 are: | Top 20 terms defining Topic 10 are: |
|---|---|
| mail | unit |
| asu | repair |
| zone | back |
| alarm | look |
| location | line |

Figure 4:
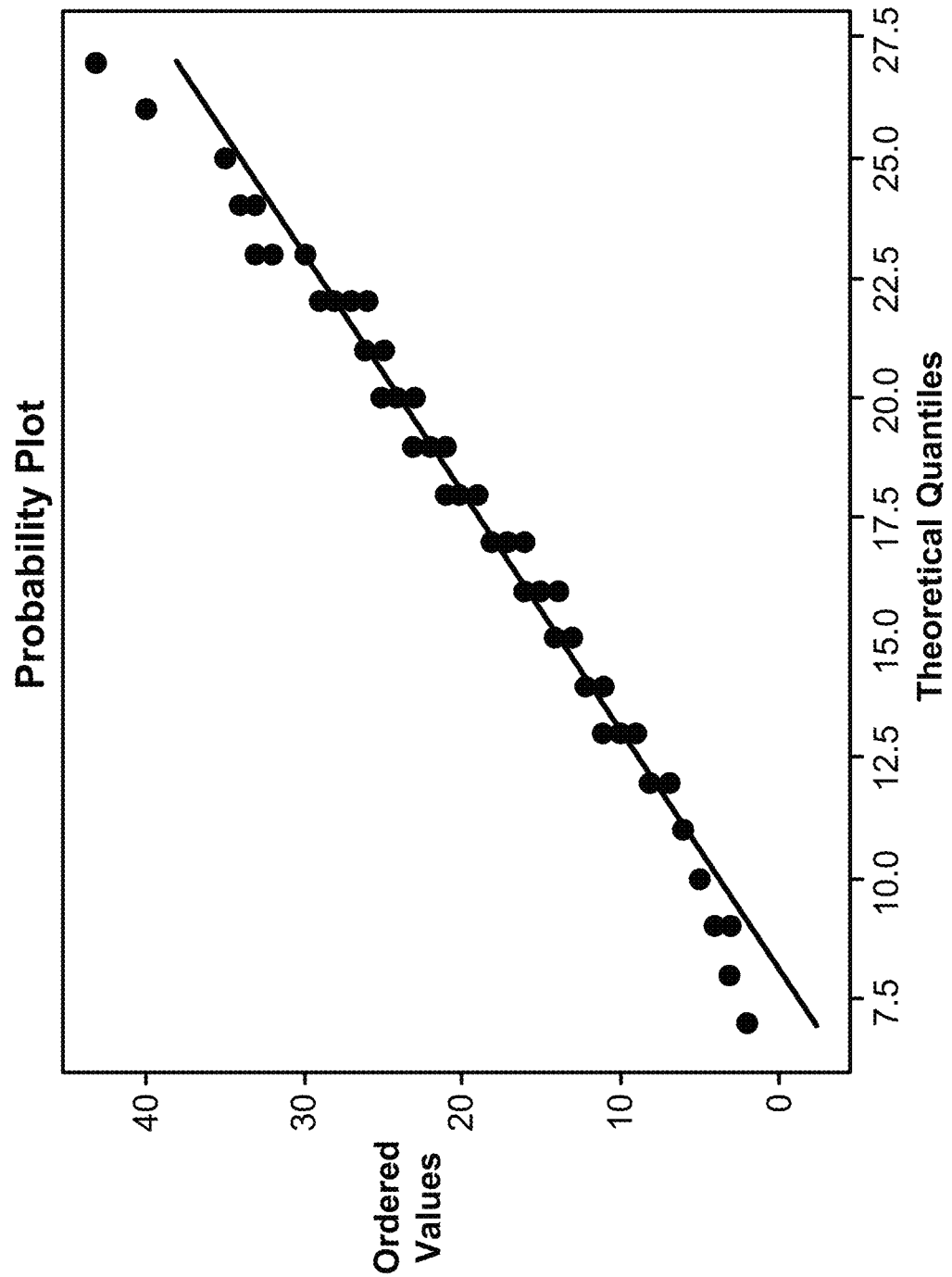
FIG. 4 is a probability plot of a failure detection tools system in accordance with various exemplary embodiments.
Figure 5:
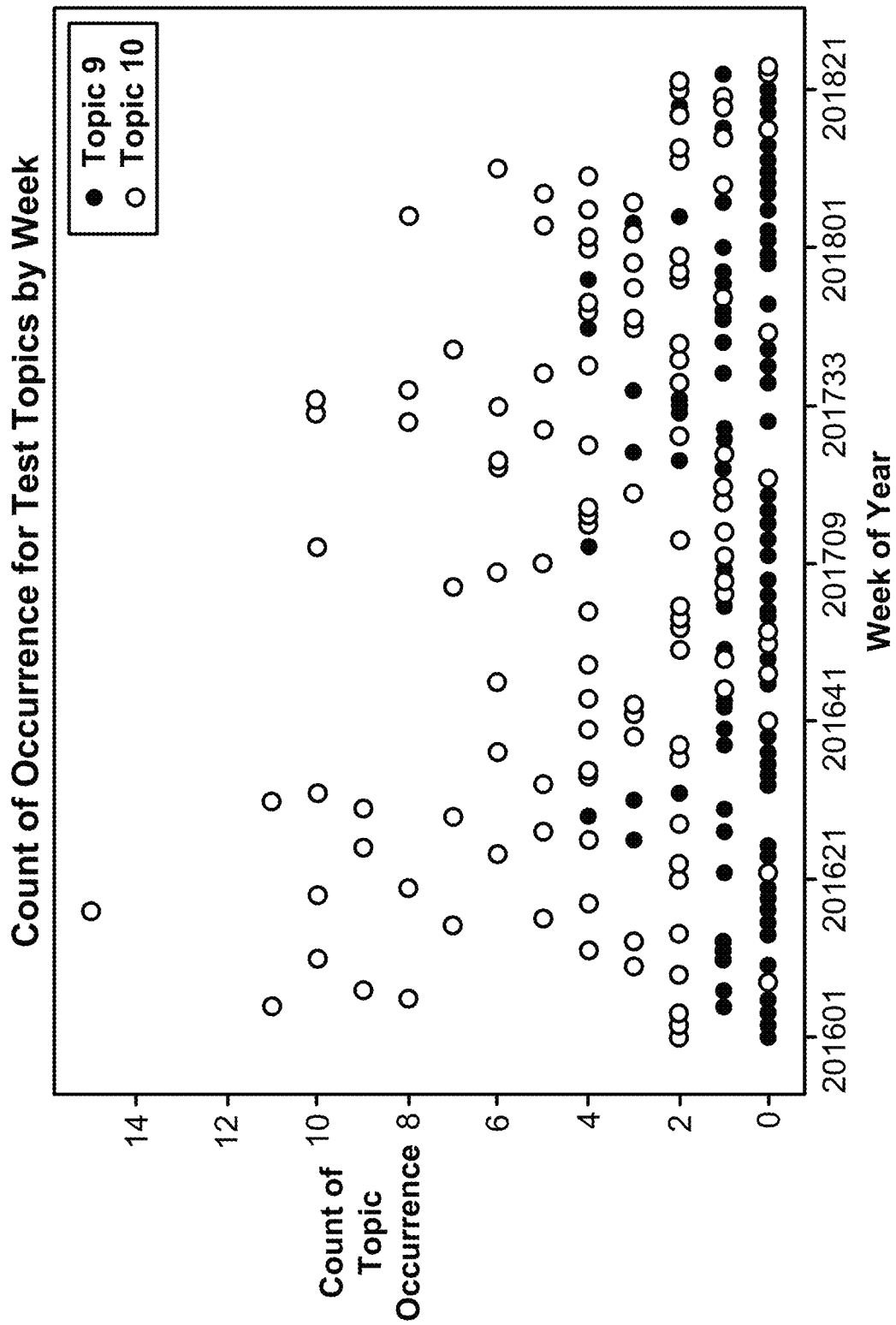
FIG. 5 is a topic frequency plot of a failure detection tools system in accordance with various exemplary embodiments.

In various embodiments and with additional reference to FIGS. 4 and 5, the trend and forecast modeling module 210 comprises a historic trend analysis engine (i.e., HTE 222) and a time-series forecasting engine (i.e., TFE 224). The trend and forecast modeling module 210 may be configured to perform various time based analytic functions on the topic list 220 data. For example, the HTE 222 may evaluate periodic (e.g., weekly) totals of each topic's occurrences via a Poisson distribution and generate plots as shown in FIGS. 4 and 5. For example, FIG. 4 illustrates a probably plot demonstrating work order topics following a Poisson distribution. In various embodiments, the HTE 222 may determine if any topic of the plurality of topics have a significantly elevated frequency based on a compression of a previous period (e.g., week)'s topic frequency and a significance level. For example, based on the count of topic occurrence as shown in FIG. 5 for Topics 9 and 10, the trend and forecast modeling module 210 may determine that Topic 10 has an elevated frequency. In various embodiments, the service 200 may select topics having the significantly elevated frequency for presentation to a user and/or further analysis. For example, the service 200 may determine that a topic has a significantly elevated frequency based on the frequency number exceeding a predetermined threshold number. The predetermined threshold number may be adjustable by an operator of the service 200 and/or a user receiving an analysis of the data. In various embodiments, the significance level may be calibrated or adjusted by the service 200 in response.

Figure 6A:
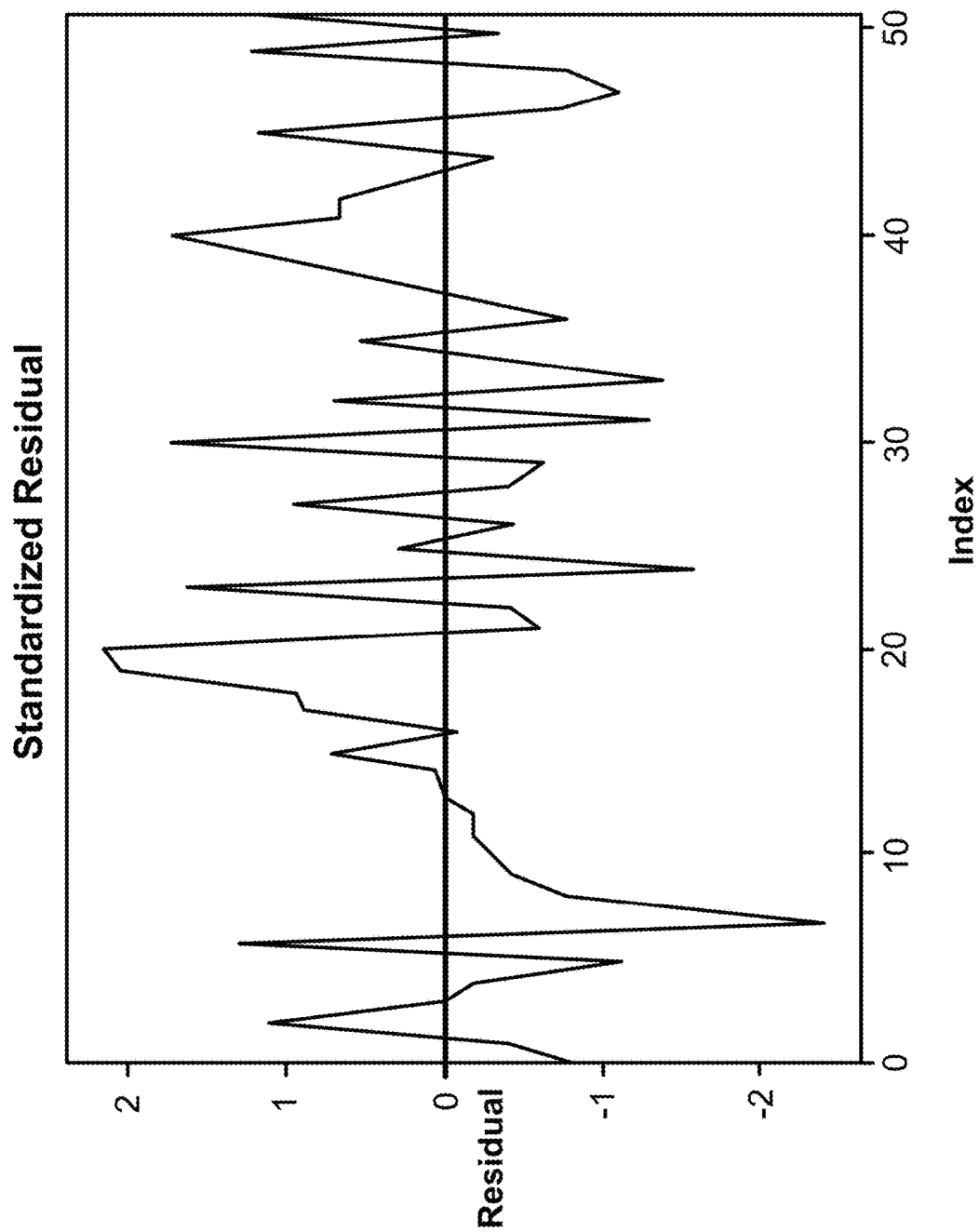
FIGS. 6A-6D are graphical representations of various types of data relating to a failure detection tools system in accordance with various exemplary embodiments.
Figure 6B:
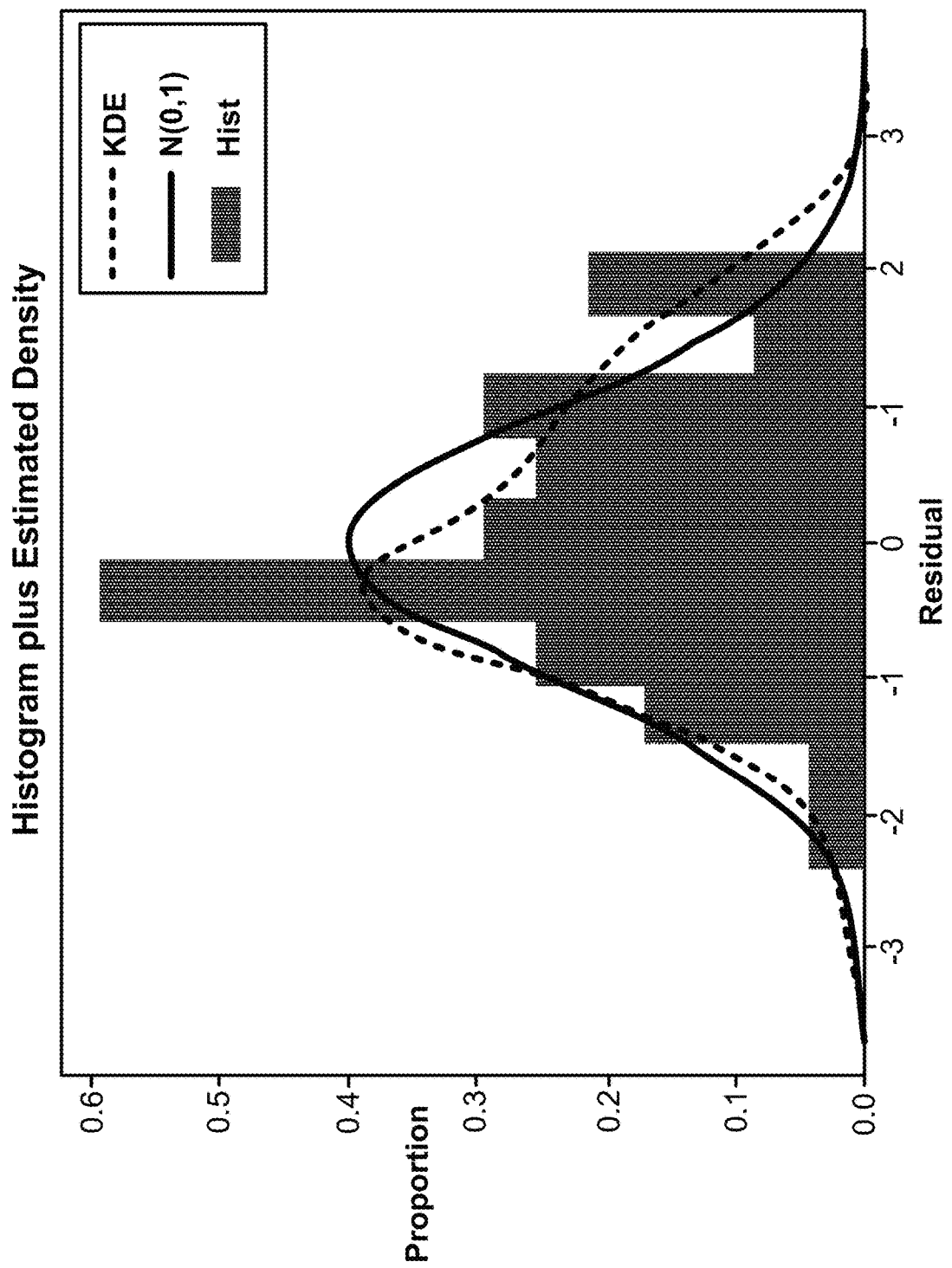
Figure 6C:
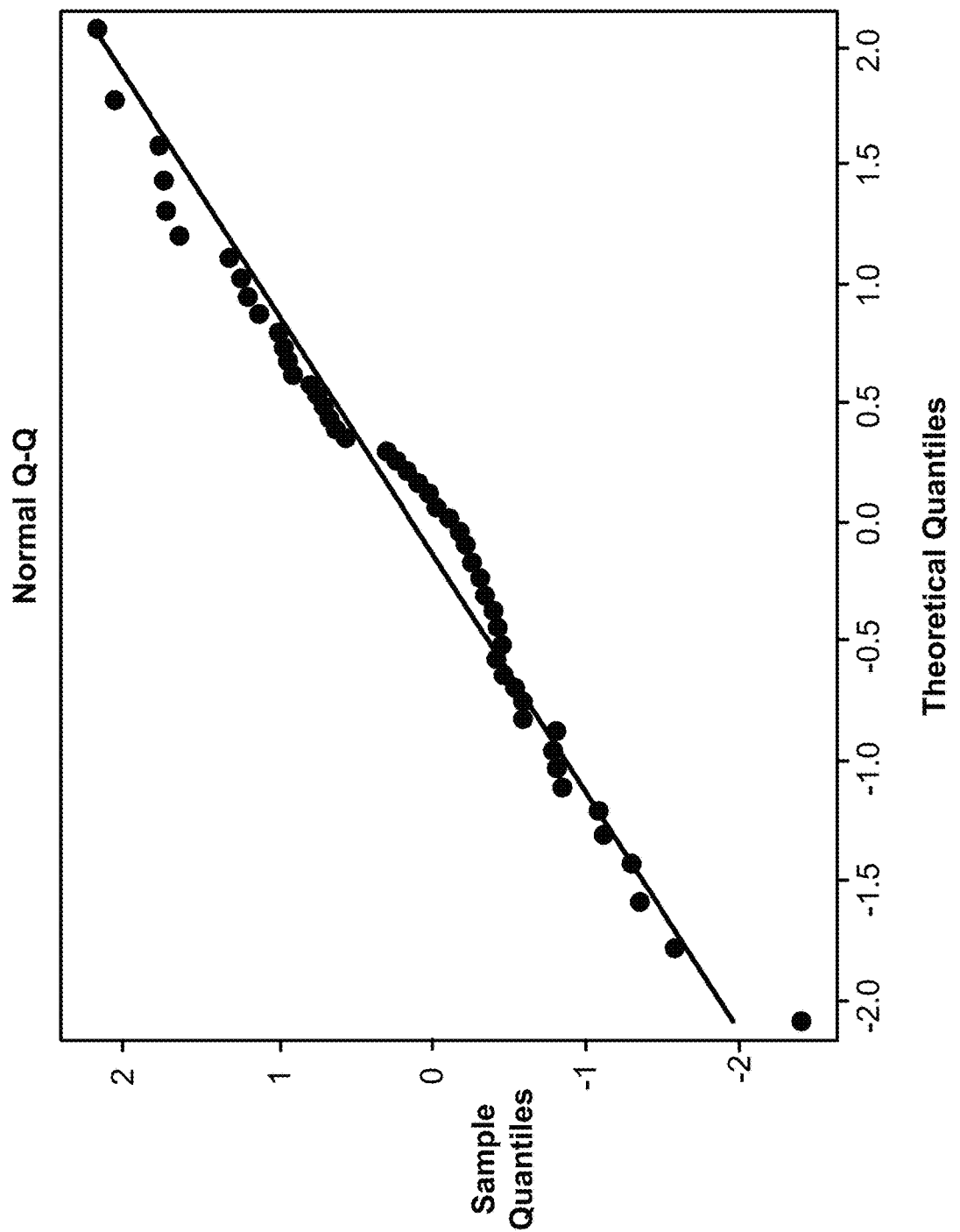
Figure 6D:
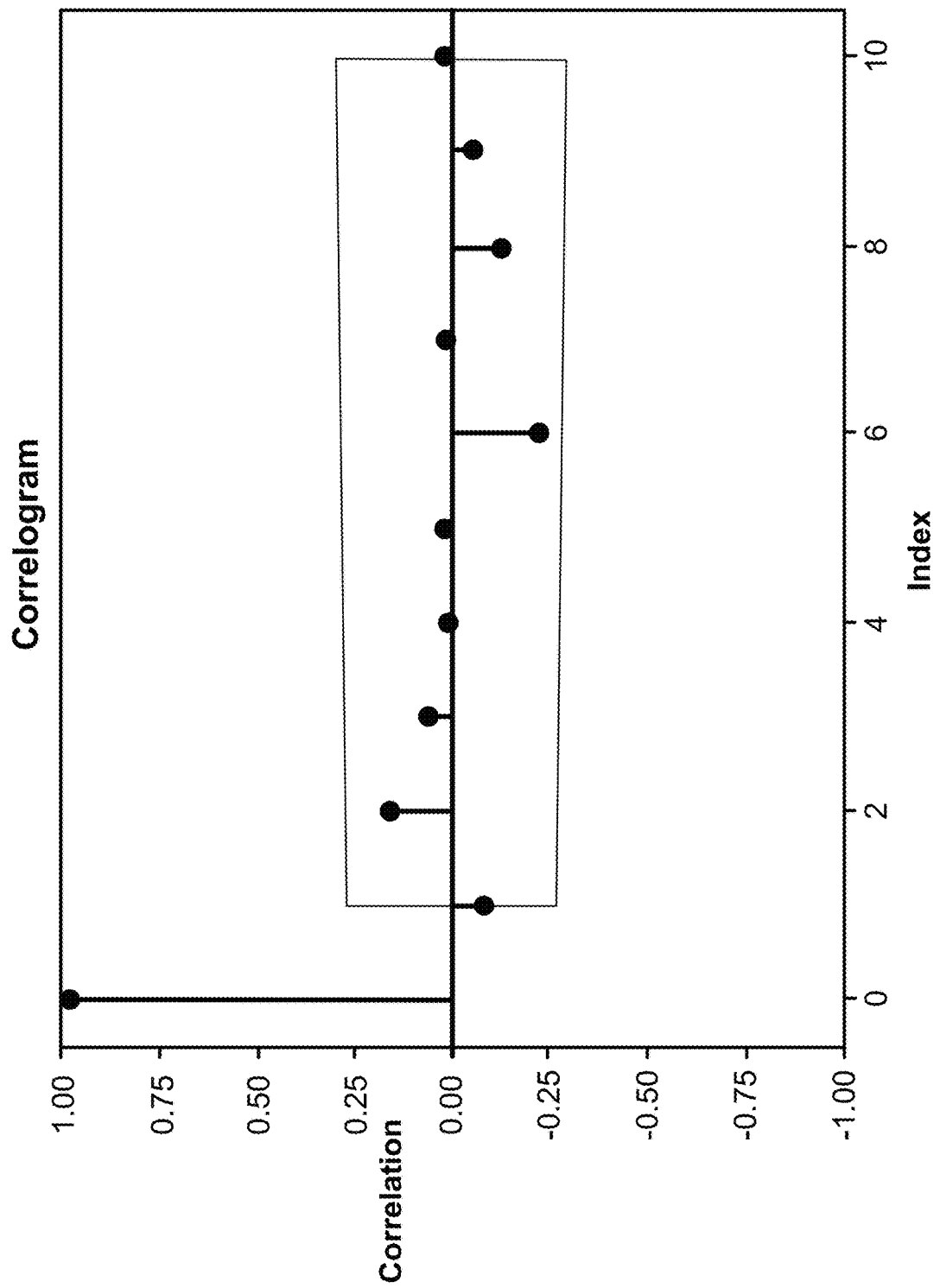

In various embodiments, the TFE 224 may be configured to project future activity relating to the various topics comprising the plurality of topics in the topic list 220 data. For example, the TFE 224 may apply a Seasonal Auto-Regressive Integrated Moving Average with exogenous regressors (SARIMAX) model, as illustrated with brief additional reference to FIGS. 6A-6D. As but one example, FIGS. 6A-6D include various graphical representations of test data indicating validity of the SARIMAX model. The graphs in FIGS. 6A-6C illustrate a normal distribution (i.e., showing, respectively, effectively random standardized residuals, normal distribution in histogram and density curves, and linearity of the points on a normal Q-Q plot), while the correlogram in FIG. 6D indicates little to no serial correlation in the data over a given period of time. It would be appreciated by one of ordinary skill in the art that the test data illustrating the normal distribution and little to no serial correlation described above indicate the validity of the SARIMAX modeling as applied to the test data as described herein. In various embodiments, the SARIMAX model estimates a total number of work orders expected in the coming week(s). It would be apparent to one of ordinary skill in the art that the TFE 224 may utilize one or more different models in conjunction with or as an alternative to the SARIMAX model, which can help with estimating the total number of work orders expected in the coming week(s), so long as the different models may be utilized in a manner consistent with the spirit and scope of the disclosure. In various embodiments, the number of weeks for projection may be adjustable (e.g., by a user or an operator of the service 200). In various embodiments, the accuracy of the model may diminish the further into the future it is estimating. The TFE 224 may compute an estimate of each forecast's accuracy, for example, by applying a modified version of the Mean Absolute Percentage Error (MAPE) score. The TFE 224 may render the MAPE score as an easy-to-understand percentage accuracy out of 100%. In various embodiments, data relating to a set of information including, e.g., the MAPE score and SARIMAX model results may be passed to the user interface module 212 for reporting. In this regard, the service 200 may generate a predictive score of failures associated with the topic types of the topic list 220.

Figure 7:
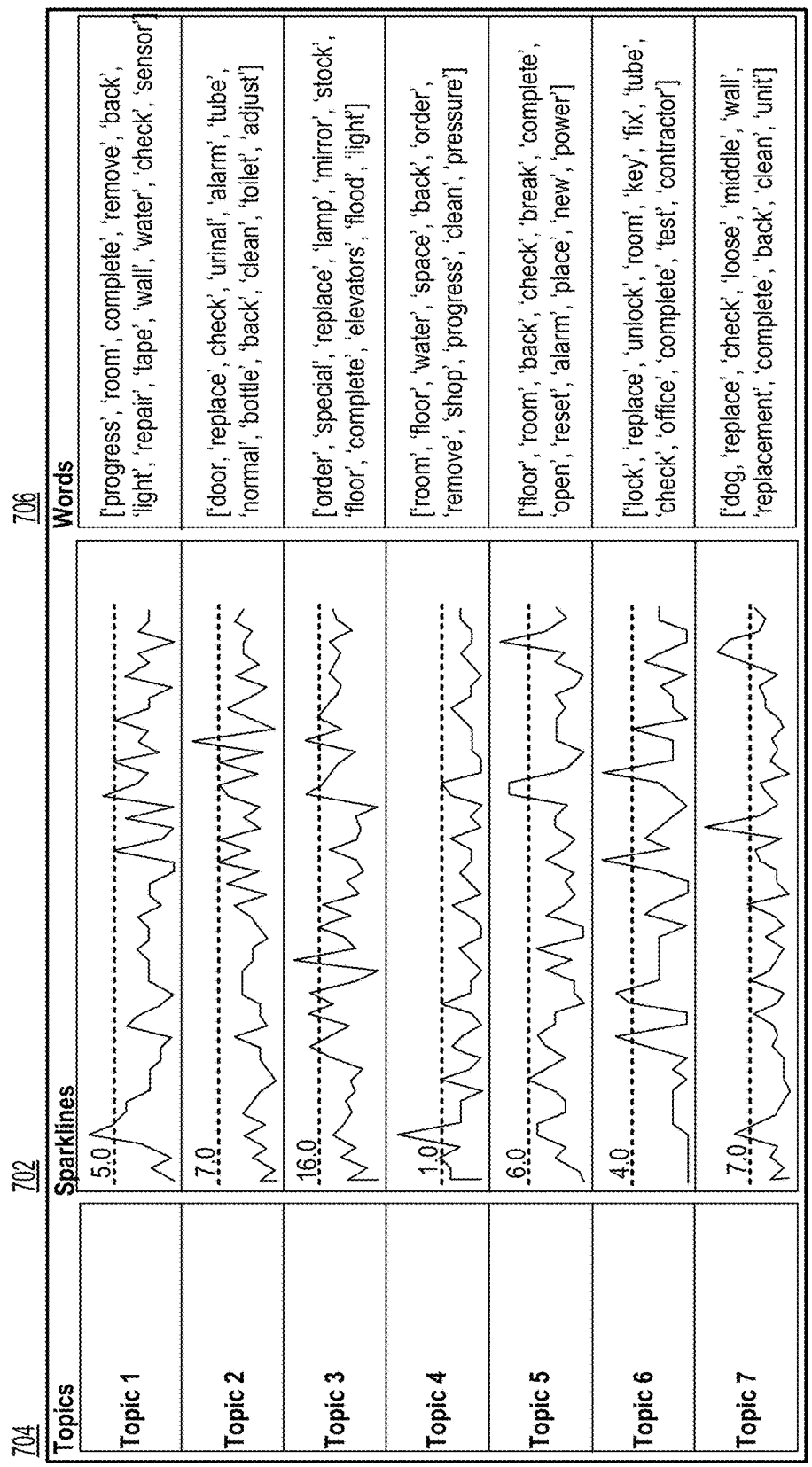
FIG. 7 is a graphical representation of a dashboard of a failure detection tools system in accordance with various exemplary embodiments.

In various embodiments, the user interface module 212 may provide outputs from the service 200 to the user devices 104. In various embodiments, the user interface module 212 may provide outputs through two channels such as, for example, a report file 226 or a dashboard (see, e.g., FIG. 7). The report file 226 may comprise any suitable data file format and include data elements such as, for example, the topic list, topics, associated keywords, and a list of the work orders flagged as historically problematic. In various embodiments and with additional reference to FIG. 7, the dashboard 700 may be a web application or web browser based dashboard. The dashboard may display time series sparklines 702 associated with each topic's 704 historical volumes along with the SARIMAX forecasts, as well as the keywords associated with each topic 704. In various embodiments, a dropdown selector (not shown) may enable a user to select, e.g, an individual building for inspection. For example, the service 200 may receive a building selection from the user device 104 via the dropdown selection. In various embodiments, the service 200 may determine a confidence value for each time series sparkline. In various embodiments, the confidence value may be determined by the service 200 based on an analysis of the time series data, and/or adjustable by a user (e.g., via user device 104). The service 200 may display, via, e.g., the user interface module 212 and the user device 104, a horizontal confidence line (e.g., dashed line in the dashboard 700) based on the associated confidence value and, thereby, enable the user to easily identify topics that have had historically significant peaks in volume. In various embodiments, the system may display error bars (not shown) for future forecasting as well as word-cloud visualizations 706. In various embodiments, the user interface module 212 may enable configurable outputs based on user requirements. For example, the user interface module 212 may allow the user to utilize the user device 104 to make various selections to specify which data (e.g., per building, per topic, per time period, etc.) to be displayed as a dashboard 700 on a display of the user device 104.

In various embodiments, the database module 214 may include any number of data structures or data elements such as, for example, raw text data 216, PPT data 218, topic list 220 data, and report file 226 data. Database module 214 may be configured to maintain raw text data 216 relating to such as, for example, work orders, text files, structure and/or building lists, and/or the like. Database module 214 may be configured to maintain PPT data 218 such as, for example, extracted text strings from text files and work orders which have been at least partially processed via process 300. Database module 214 may be configured to maintain topic list 220 data such as, for example, as generated via process 300. Database module 214 may be configured to maintain report file 226 data such as, for example, as generated by service 200 for communication via user interface module 212.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more" Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID operating system, an APPLE® iOS operating system, a BLACKBERRY company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL", PHP, awk, PYTHON®, Visual Basic, SQL Stored Procedures, PL/SQL, any UNIX× shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like Still further, the system could be used to detect or prevent security issues with a client-side scripting language, such as JAVASCRIPT®. VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER database, are used in conjunction with MICROSOFT® operating systems, WINDOWS NT® web server software, SQL SERVER database, and MICROSOFT® Commerce Server. Additionally, components such as ACCESS® software, SQL SERVER& database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERLR®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE Web Server, SUN JAVA® System Web Server, JAVA® Virtual Machine running on LINUX® or WINDOWS® operating systems).

A web client includes any device or software which communicates via any network, such as, for example, any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL® AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables Each record may be a single file, a series of files, a linked series of data fields, or any other data structure.

The disclosure and claims do not describe only a particular outcome of a system for failure detection tools, but the disclosure and claims include specific rules for implementing the outcome of a system for failure detection tools and that render information into a specific format that is then used and applied to create the desired results of a system for failure detection tools, as set forth in *McRO, Inc. v. Bandai Namco Games America Inc.* (Fed. Cir. case number 15-1080, Sep. 13, 2016). In other words, the outcome of a system for failure detection tools can be performed by many different types of rules and combinations of rules, and this disclosure includes various embodiments with specific rules. While the absence of complete preemption may not guarantee that a claim is eligible, the disclosure does not sufficiently preempt the field of a system for failure detection tools at all. The disclosure acts to narrow, confine, and otherwise tie down the disclosure so as not to cover the general abstract idea of just a system for failure detection tools. Significantly, other systems and methods exist for a system for failure detection tools, so it would be inappropriate to assert that the claimed invention preempts the field or monopolizes the basic tools of a system for failure detection tools. In other words, the disclosure will not prevent others from a system for failure detection tools, because other systems are already performing the functionality in different ways than the claimed invention. Moreover, the claimed invention includes an inventive concept that may be found in the non-conventional and non-generic arrangement of known, conventional pieces, in conformance with Bascom v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

What is claimed is:

1. A failure detection method for a computer-based system, the method comprising:
receiving, by the computer-based system comprising a processor, a raw text data;
removing, by the computer-based system and through a removing step, a punctuation and a non-informative word from the raw text data;
generating, by the computer-based system and responsive to the removing step, a preprocessed text data;
applying, by the computer-based system, a Latent Dirichlet Allocation (LDA) algorithm to the preprocessed text data;
generating, by the computer-based system, a topic list comprising a plurality of topics;
evaluating, by the computer-based system and through an evaluating step, each of the plurality of topics by a coherence of the respective topic;
identifying, by the computer-based system, at least one of a trend or a prediction relating to the preprocessed text data responsive to performing the evaluating step; and
transmitting, by the computer-based system, the at least one of the trend or the prediction to a graphical user interface displayed on a user device.

2. The method of claim 1, wherein:
the evaluating step further comprises assigning a coherence score to each of the plurality of topics, and
responsive to the coherence of a first of the plurality of topics being less than a predetermined threshold score, the method further comprises removing, by the computer-based system, the first of the plurality of topics.

3. The method of claim 1, further comprising:
applying, by the computer-based system, a time-based analytic function to the topic list; and
generating, by the computer-based system, a predictive score of failures associated with topic types of the topic list.

4. The method of claim 3, wherein the time-based analytic function is one of a Poisson distribution evaluation, a Seasonal Auto-Regressive Integrated Moving Average with eXogenous regressors (SARIMAX) model, or a modified version of Mean Absolute Percentage Error (MAPE) score.

5. The method of claim 3, further comprising:
receiving, by the computer-based system, a work order; and
extracting, by the computer-based system, the raw text data from the work order, wherein the work order is associated with a building.

6. The method of claim 5, further comprising estimating, by the computer-based system, a future number of work orders associated with the building.

7. The method of claim 1, further comprising removing, by the computer-based system, a proper name from the raw text data, wherein the raw text data is received through a data handler of the computer-based system.

8. The method of claim 7, wherein the punctuation and the non-informative word from the raw text data is removed by a text processing module of the computer-based system.

9. The method of claim 1, further comprising storing, by the computer-based system, the preprocessed text data.

10. The method of claim 1, wherein the at least one of the trend or the prediction corresponds to at least one of the plurality of topics.

11. The method of claim 1, further comprising:
determining if any of the plurality of topics have a frequency and a significance level that exceed a threshold frequency and a threshold significance level; and
responsive to the frequency exceeding the threshold frequency and the significance level exceeding the threshold significance level for one of the plurality of topics, selecting the one of the plurality of topics for presentation to a user.

12. The method of claim 11, further comprising transmitting a graphical display of the one of the plurality of topics to a user interface.

13. The method of claim 1, further comprising:
receiving, by the computer-based system, a plurality of work orders; and
extracting, by the computer-based system, the raw text data from each of the plurality of work orders, wherein each of the plurality of work orders includes at least a portion of a maintenance operation related to one or more buildings.

14. The method of claim 1, further comprising:
generating, by the computer-based system and responsive to the evaluating step, a report file; and
storing, by the computer-based system, the report file in a database.

15. The method of claim 14, further comprising communicating, by the computer-based system and through a user interface module, the report file to a user interface.

16. The method of claim 1, further comprising:
receiving, by computer-based system and through a user interface, a building selection from a user; and
generating, by the computer-based system and responsive to the building selection, a graphical display including one or more parameters associated with at least one of the plurality of topics and the building selection.

17. The method of claim 16, further comprising determining a confidence value the at least one of the plurality of topics, wherein the graphical display further comprises a confidence line based on the confidence value for the at least one of the plurality of topics.

18. An article of manufacture configured to perform the failure detection method for the computer-based system of claim 1, the article of manufacture including a non-transitory, tangible computer readable storage medium having instructions stored thereon that, in response to execution by the processor, cause the processor to perform operations comprising each step of the failure detection method for the computer-based system.

19. The method of claim 1, wherein each step of the failure detection method for the computer-based system is performed by the processor.

* * * * *